UNITED STATES PATENT OFFICE.

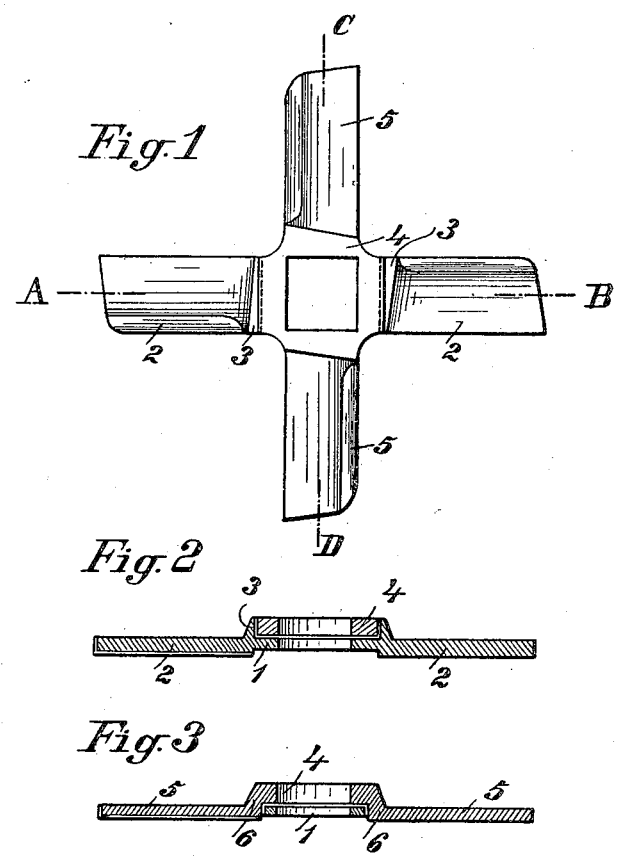

ALEXANDER GÖMÖRY, OF BUDAPEST, AUSTRIA-HUNGARY.

KNIFE FOR MINCING-MACHINES.

No. 922,884.  Specification of Letters Patent.  Patented May 25, 1909.

Application filed January 7, 1909. Serial No. 471,128.

*To all whom it may concern:*

Be it known that I, ALEXANDER GÖMÖRY, subject of the King of Hungary, residing at Budapest, Empire of Austria-Hungary, have invented new and useful Improvements in Knives for Mincing-Machines, of which the following is a specification.

This invention relates to a knife for use with mincing machines.

According to the invention the blades or arms of the knife are provided with two cutting edges and can be easily detached and secured in position, whereby the grinding of the cutting edges can be effected quickly and with facility. The blades are mounted in such a manner that they are securely retained in place during the cutting operation.

The accompanying drawing illustrates one form of knife made according to the invention.

In the said drawing:—Figure 1 is a plan view of the knife, and Figs. 2 and 3 are transverse sections respectively on the lines A—B and C—D Fig. 1.

The lower knife is integral with the annular boss and is provided with blades 2, 2, the cutting edges of which are on opposite sides of the knife. Between the boss and the blades there are arranged projecting ribs 3, 3 forming a bearing in which the boss 4 of the second knife is introduced. This knife is placed at an angle to the knife 1, 2 and is so arranged that the downwardly projecting ribs 6, which are located between the oppositely directed cutting edges 5 and the boss 4, are applied against the sides of the lower boss. The knives are by this means rigidly secured in place but can be easily removed for the purpose of grinding, so that no special devices are necessary for this purpose.

A further advantage of the two-part knife consists in the fact that in case one of the blades should fracture it is only necessary to detach and replace one of the knives whereas in the case of a single blade knife a fracture renders the whole of the knife useless.

I claim as my invention:—

1. A mincing machine knife comprising a pair of arms or blades disposed in the same plane each having oppositely directed cutting edges, bosses integral with the said arms, and ribs between the cutting edges of the blade and the bosses, the ribs of one arm interlocking with the boss of the other arm, substantially as hereinbefore described.

2. A mincing machine knife comprising in combination, companion arms each provided with two knives, said arms being disposed in cross relation and lying in the same plane, the intersecting portions of said arms having interlocking members adapted to hold said arms in prescribed relation with respect to each other.

In testimony whereof I have signed my name to this specification in the presence of two subscribing witnesses.

ALEXANDER GÖMÖRY.

Witnesses:
JOSEPH WIEKMANN,
BÉNI GRÜNWALD.